Dec. 13, 1960 N. H. BLAKSTAD 2,963,918
CHAIN OR BELT TENSIONING DEVICES
Filed July 27, 1959 3 Sheets-Sheet 1

Inventor
Nigel Henry Blakstad
By [signature]
Patent Agent

Dec. 13, 1960 N. H. BLAKSTAD 2,963,918
CHAIN OR BELT TENSIONING DEVICES
Filed July 27, 1959 3 Sheets-Sheet 2
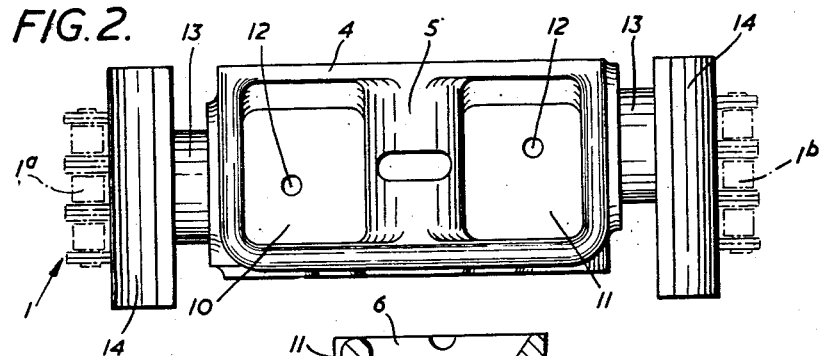
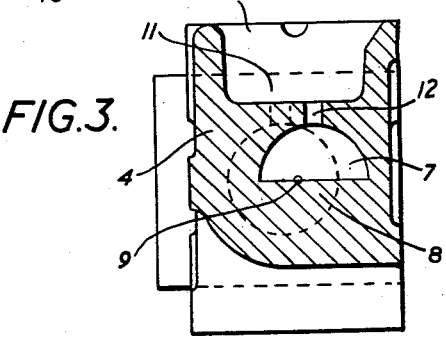
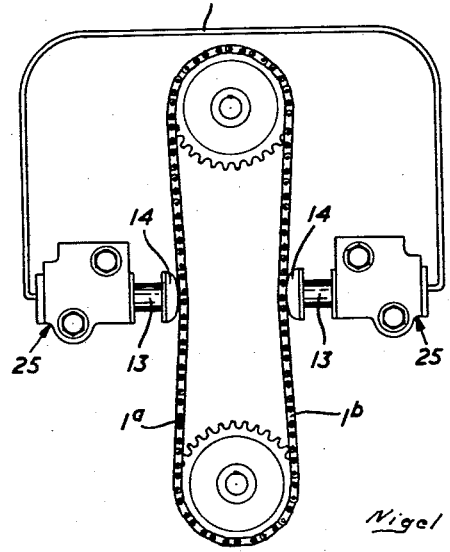
Inventor
Nigel Henry Blakstad
By
Patent Agent Dec. 13, 1960  N. H. BLAKSTAD  2,963,918
CHAIN OR BELT TENSIONING DEVICES
Filed July 27, 1959  3 Sheets-Sheet 3

Inventor
Nigel Henry Blakstad
By
Patent Agent

United States Patent Office 2,963,918
Patented Dec. 13, 1960

2,963,918

CHAIN OR BELT TENSIONING DEVICES

Nigel Henry Blakstad, Birmingham, England, assignor to Perry Chain Company Limited, Birmingham, England, a British company Filed July 27, 1959, Ser. No. 829,588

Claims priority, application Great Britain Aug. 12, 1958

6 Claims. (Cl. 74—242.8)

This invention relates to means for tensioning driving chains or belts employed in machinery or mechanism of any kind for the purpose of transmitting a driving effort, said tensioning means being of the kind wherein a spring-influenced plunger, movable in a cylinder containing a hydraulic fluid, carries or operates a slipper or other pressure-applying part arranged to engage the chain or belt, provision being made whereby additional fluid can enter behind the plunger as it moves outwards under the influence of its spring, so that the cylinder is always maintained fully charged with fluid.

The present invention concerns chain or belt tensioning means, of the kind referred to, intended for use with a driving chain or belt in which each of the two runs or sides thereof respectively at opposite sides of a sprocket or pulley, is liable to be alternatively tensioned and relaxed, one run being tensioned and the other being slack during normal driving in one direction or during acceleration, but said first-named run becoming slack and the other being tensioned in the event of overrun occurring in the mechanism or in the event of the drive being reversed; and the object of the invention is to provide tensioning means which can automatically and smoothly take up the slack in whichever run of the chain or belt is relaxed, and at the same time, permit of the tensioned run being straightened, without the occurrence of any snatch or jerking action in the course of the change-over.

According to the invention, chain or belt tensioning means, of the kind referred to, comprises two spring-influenced plungers for co-operation with the two runs or sides of a chain or belt, respectively at opposite sides of a sprocket or pulley, said plungers being respectively movable in two fluid-containing cylinders adapted to be each maintained fully charged with hydraulic fluid and connected one with the other by means of a passage or orifice which permits of a restricted flow and transference of hydraulic fluid between two said cylinders, whereby in use, the two plungers move together in a controlled manner so as to effect a smooth change in the tensions of the two runs or sides of the chain or belt whenever a reversal or overrun of the drive occurs.

Conveniently the two cylinders may be combined as a unitary structure designed to be mounted on a stationary part of a machine between the two runs of the chain or belt, so that the plungers apply pressure to the inside of the chain or belt. The cylinders may or may not be in alignment and may be integral with one another, being separated by a dividing wall or partition in which a small aperture is formed; or, they may be disposed one above the other but communicating with one another by a suitable small bore passage or port.

In a modified arrangement the two cylinders may be disposed outside the contour of the chain or belt, the slippers associated with the plungers being operable upon the outside of the latter, tending to deflect the slack run of the said chain or belt towards the tensioned run, and the cylinders being in communication one with the other by means of a pipe of a suitable diameter to give the desired restricted flow of fluid, or having a suitable restriction in its bore.

How the invention may be carried out will now be more particularly described in connection with several exemplary embodiments illustrated in the accompanying drawings.

In the said drawings,

Figure 2 is a top plan view of the tensioning means of Figure 1;

Figure 3 is a transverse section on line III—III of Figure 1 with the plunger removed;

Figure 5 illustrates a further modified arrangement.

Figure 1:
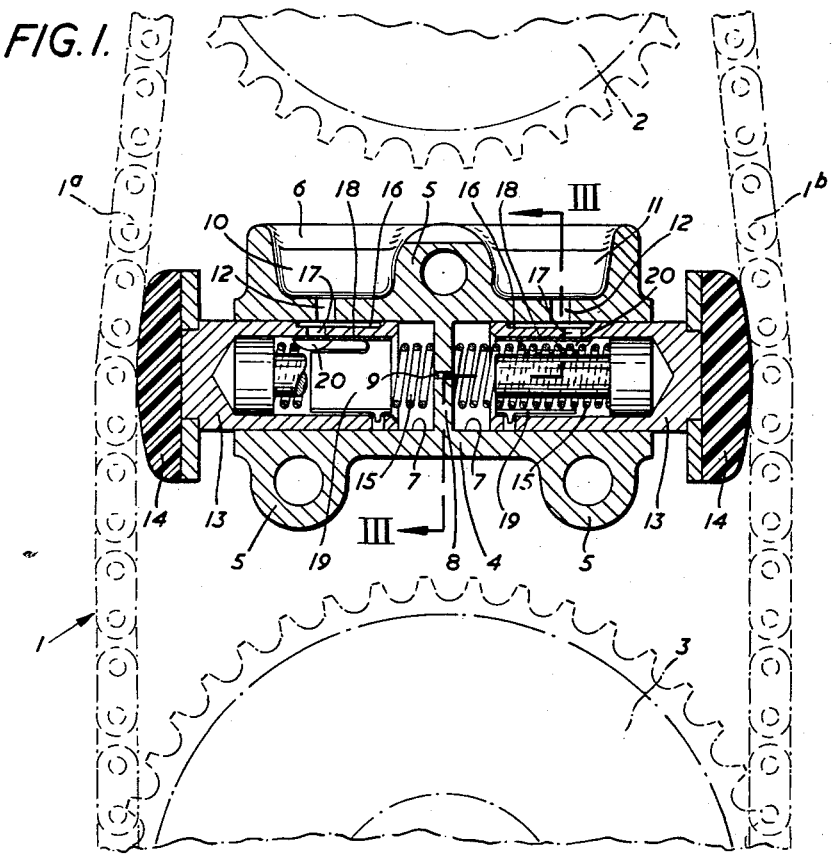
Figure 1 is a longitudinal vertical section through one form of tensioning means in accordance with the invention, shown applied to a chain drive.

Referring first to Figures 1 to 3 of the drawings, the tensioning means consists of a device operable upon the two opposite runs 1$^a$ and 1$^b$ of an endless driving chain 1 meshing with two sprocket wheels 2 and 3, and it comprises a carrier block 4 adapted to be located between the two said chain runs, and having integral lugs 5 for receiving attachment bolts. This carrier block 4 is formed, at the top, with an open oil reservoir 6, and in the lower part of the carrier block two horizontal cylinders 7, 7, are bored, one from each end. The outer ends of these cylinders 7, 7, are thus open, and the inner ends are separated from one another, at the middle of the block, by a transverse wall or partition 8 drilled with small-diameter restricted orifice or bleed hole 9. The top reservoir 6 is divided into two compartments 10 and 11 each of which communicates with each respective cylinder 7 by an aperture 12 so that oil can enter the cylinders and maintain them fully charged. Oil can also flow from one cylinder to the other through the orifice 9, but only at a predetermined controlled rate because of the small size of the latter.

Each cylinder 7 contains a freely-slidable plunger 13 of hollow or tubular form, open at its inner end, but closed at its outer end; and carried by this closed outer end is a slipper 14 having a conveniently-shaped outer face of rubber or nylon for example, for engagement with the innermost surface of the chain 1. Each plunger 13 is forced outwards in its cylinder 7, by means of a compression spring 15 located within the hollow interior of the plunger and taking a bearing on the dividing wall or partition 8 between the two cylinders, and the two slippers 14 are arranged to press outwards on the two respective runs 1$^a$ and 1$^b$, of the chain, as illustrated in Figure 1.

The top side of each plunger 13 has in it a longitudinal groove 16 movable over the aperture 12 in the bottom of the oil reservoir and towards one end of this groove 16 an aperture 17 is provided in the wall of the plunger 13 for enabling the oil to reach the interior of the cylinder. In an alternative arrangement (not illustrated), the longitudinal groove may run along the top wall of the cylinder, instead of along the top of the plunger. In either case, the aperture 17 in the plunger is controlled by a clack valve which, in the embodiment illustrated, consists of a flexible steel blade or finger 18 carried by a tubular body 19 located within the hollow plunger and having at its free end a convex head 20 (which may have a small aperture in it) adapted to seat over the aperture 17 to close the same. This arrangement of the apertures, grooves and clack valve is substantially as described in U.S. Patent 2,893,255, the valve opening the aperture 17 in the plunger as the latter moves outwards, to allow oil to flow into the cylinder, but closing in the event of the plunger 13 attempting to move inwards away from the tensioned "slack" or return run of the chain. In another construction, the plunger 13 or the cylinder 7 may have a series of apertures co-operating with a single aperture in the cylinder or piston (as the case may be).

In operation, when normal driving is in progress is a given direction, the drive pulls one run of the chain 1 taut and tends to leave the other or return run relaxed and slack. The plungers 13 in the two cylinders 7, 7, tend to be forced outwards by their springs 15 in opposite directions, so that the slippers 14, 14, exert pressure on the inside surface of both runs. The plunger 13 that co-operates with the taut run of the chain 1 remains at or near the inner end of its cylinder, but the other plunger 13 is moved towards the outer end of its cylinder until the slack in the relaxed run of the chain is taken up, the clack valve admitting oil into the cylinder; and any inward movement of the said plunger is substantially prevented, so long as the other run of the chain remains taut, by reason of the clack valve closing, although slight inward movement, to allow for inaccuracies in the mounting of the sprocket wheels, may be permitted if the head 20 of the clack valve has a small aperture in it, as already referred to.

In the event of an overrun occurring, or if the motion is reversed, the chain run that was previously taut will become slack and the other run will become taut. When this happens the plunger 13 that had been moved outwards in its cylinder will be moved inwards by the tautened run of the chain at a controlled rate, notwithstanding that the clack valve closes, by reason of the oil behind it being forced through the small orifice or bleed hole 9 in the dividing wall 8 between the two cylinders 7, 7, into the second cylinder, the plunger therein being moved outwards to take up the slack in the now relaxed run of the chain.

When acceleration occurs following an overrun, the position of the two plungers 13, 13, will be changed over, without shock or snatch, by a similar operation to that just described. The arrangement not only ensures the change-over being effected smoothly, but obviates the two plungers becoming locked in one position, as they are compelled to move in unison or substantially so.

Figure 4:
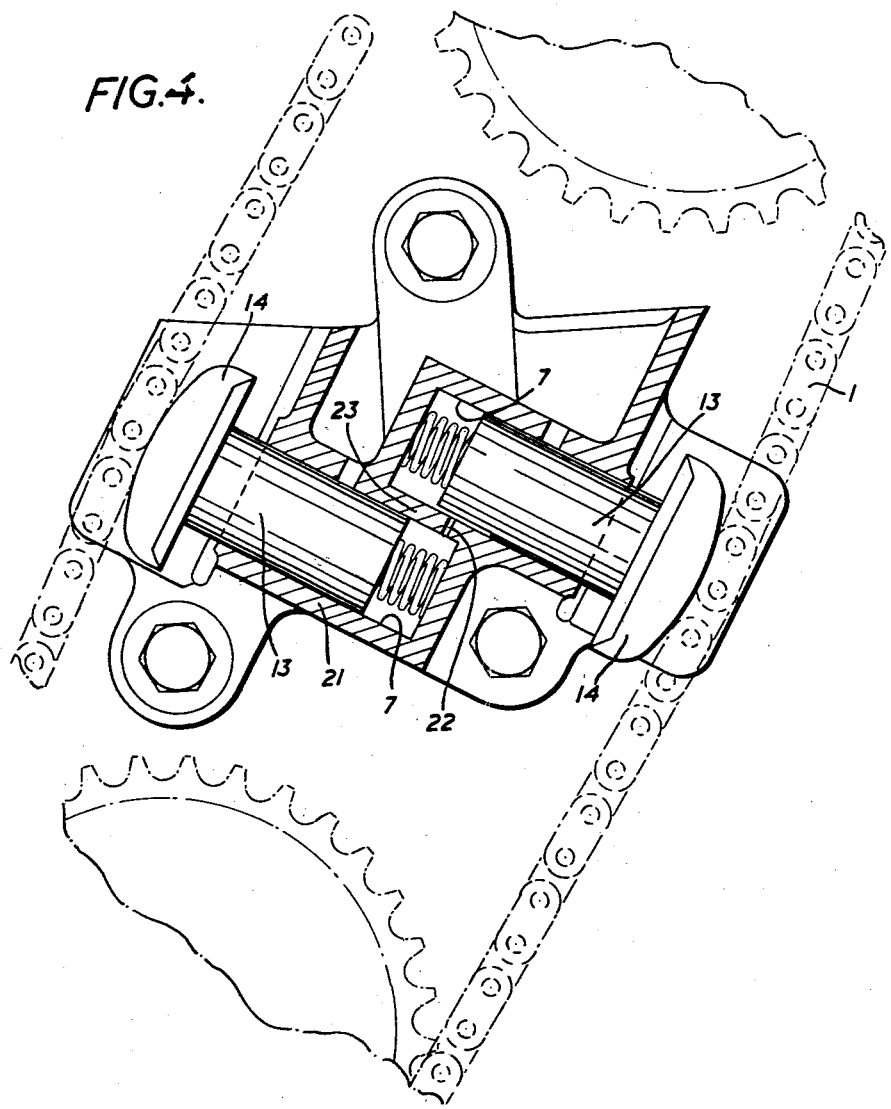
Figure 4 shows a modified form of chain tensioning means.

In the modification illustrated in Figure 4, the two cylinders 7, 7, are offset one above the other, being formed in a single casting 21 with their inner ends overlapping, a narrow passage or bleed tube 22 being provided through the separating wall 23. A flat 24 on the plunger 13 in the upper cylinder ensures communication of the passage 22 with the interior of the upper cylinder 7 for all positions of the plunger.

In a further arrangement illustrated in Figure 5, two cylinders form part of separate tensioning units 25 positioned outside the opposite chain runs 1ª and 1ᵇ, so that the slippers 14 on the plungers 13 engage the outermost surfaces of the chain. In this case the interiors of the cylinders are connected by a pipe 26 of suitable bore to give the controlled oil flow.

Instead of the plungers 13 directly carrying slippers 14, they may act on pivoted slippers; and instead of the plungers acting on slippers they may operate on sprocket wheels that engage the chain, as described in the aforesaid patent. Other modifications in the tensioning arrangement may also be made within the scope of the patent as defined in the appended claims.

I claim:
1. A drive chain or belt tensioning device comprising a first hydraulic-fluid-containing cylinder, a plunger movable in said cylinder, spring means urging said plunger outwards in the cylinder, a pressure-applying member acted upon by said plunger and adapted to engage the run of the chain or belt at one side of a driving or driven sprocket or pulley, a second hydraulic-fluid-containing cylinder, a second plunger movable in said second cylinder, spring means urging said second plunger outwards in said second cylinder, a second pressure-applying member acted upon by said second plunger and adapted to engage the run of the chain or belt at the other side of said driving or driven sprocket or pulley, means enabling additional hydraulic fluid to enter said cylinders and maintain them fully charged with fluid as the plungers therein move so as to increase the total interior volume while preventing free discharge of fluid from the cylinders, and a passage communicating between the interiors of said cylinders permitting of a restricted flow and transference of hydraulic fluid, therebetween whereby in use, the two plungers move together in a controlled manner so as to effect a smooth change in the tensions of the two runs of the chain or belt whenever a reversal or overrun of the drive occurs.

2. A drive chain or belt tensioning device comprising a one-piece block, a first hydraulic-fluid-containing cylinder bored in said block, a plunger movable in said cylinder, spring means urging said plunger outwards in the cylinder, a member acted upon by said plunger and adapted to apply a tensioning pressure to the run of the chain or belt at one side of a driving or driven sprocket or pulley, a second hydraulic-fluid-containing cylinder also bored in said block, a second plunger movable in said second cylinder, spring means urging said second plunger outwards in said second cylinder, a member acted upon by said second plunger and adapted to apply a tensioning pressure to the run of the chain or belt at the other side of said driving or driven sprocket or pulley, means enabling additional hydraulic fluid to enter said cylinders and maintain them fully charged with fluid as the plungers therein move so as to increase the total interior volume while preventing free discharge of fluid from the cylinders, and a passage communicating between the interiors of said cylinders permitting of a restricted flow and transference of hydraulic fluid therebetween whereby in use, the two plungers move together in a controlled manner so as to effect a smooth change in the tensions of the two runs of the chain or belt whenever a reversal or overrun of the drive occurs.

3. A device for tensioning drive chains or belts comprising a first hydraulic-fluid-containing cylinder, a plunger movable in said cylinder, spring means urging said plunger outwards in the cylinder, a member acted upon by said plunger and adapted to apply a tensioning pressure to a run of the chain or belt, a second hydraulic-fluid-containing cylinder, a second plunger movable in said second cylinder, spring means urging said second plunger outwards in said second cylinder, a member acted upon by said second plunger and adapted to apply a tensioning pressure to an opposite run of the chain or belt, said two pressure-applying members being urged to move in opposite directions away from one another so that in use they will normally engage the inside of the chain or belt, means enabling additional hydraulic fluid to enter said cylinders and maintain them fully charged with fluid as the plungers therein move so as to increase the total interior volume while preventing free discharge of fluid from the cylinders, and a passage communicating between the interiors of said cylinders permitting of a restricted flow and transference of hydraulic fluid therebetween whereby in use, the two plungers move together in a controlled manner so as to effect a smooth change in the tensions of the two runs of the chain or belt whenever a reversal or overrun of the drive occurs.

4. A device for tensioning drive chains or belts comprising a first hydraulic-fluid-containing cylinder, a plunger movable in said cylinder, spring means urging said plunger outwards in the cylinder, a pressure-applying member acted upon by said plunger and adapted to engage the run of the chain or belt at one side of a driving or driven sprocket or pulley, a second hydraulic-fluid-containing cylinder, a second plunger movable in said second cylinder, spring means urging said second plunger outwards in said second cylinder, a second pressure-applying member acted upon by said plunger and adapted to engage the run of the chain or belt at the other side of said driving or driven sprocket or pulley, means enabling additional hydraulic fluid to enter said cylinders and maintain them fully charged with fluid as the plungers therein move so as to increase the total interior volume while preventing free discharge of fluid from the cylinders, said first and second cylinders forming part of separate units, and a pipe communicating between the interiors of said cylinders so as to permit of a restricted flow and transference of hydraulic fluid therebetween whereby in use, the two plungers move together in a controlled manner so as to effect a smooth change in the tensions of the two runs of the chain or belt whenever a reversal or overrun of the drive occurs.

5. A drive chain or belt tensioning device comprising a first hydraulic-fluid-containing cylinder, a plunger movable in said cylinder, spring means urging said plunger outwards in the cylinder, a pressure-applying member acted upon by said plunger and adapted to engage the run of the chain or belt at one side of a driving or driven sprocket or pulley, a second hydraulic-fluid-containing cylinder, a second plunger movable in said second cylinder, spring means urging said second plunger outwards in said second cylinder, a second pressure-applying member acted upon by said second plunger and adapted to engage the run of the chain or belt at the other side of said driving or driven sprocket or pulley, a hydraulic fluid storage reservoir, clack valve means associated with each cylinder for admitting additional hydraulic fluid and maintaining the cylinders fully charged with fluid as the plungers therein move so as to increase the total interior volume, and a passage communicating between the interiors of said cylinders permitting of a restricted flow and transference of hydraulic fluid therebetween whereby in use, the two plungers move together in a controlled manner so as to effect a smooth change in the tensions of the two runs of the chain or belt whenever a reversal or overrun of the drive occurs.

6. In a belt or chain tensioner, a body member adapted for mounting between reaches of a belt or chain leading from a pulley or sprocket, a cylinder extending into the body member from each side, a piston in each cylinder movable outwardly therein, toward the said reaches of the chain or belt, a spring urging each piston outwardly in its respective cylinders, a pressure member on the end of each piston for engagement with the pertaining reach of the chain or belt, a restricted passage in said body member hydraulically interconnecting said cylinders for exchange of fluid therebetween, a reservoir on said body member, and a valve connecting said reservoir with each cylinder permitting free flow of fluid therebetween in the direction of the cylinders only.

References Cited in the file of this patent

UNITED STATES PATENTS

| | | |
|---|---|---|
| 2,185,079 | Hall | Dec. 26, 1939 |
| 2,766,417 | Merritt | Oct. 9, 1956 |
| 2,893,255 | Bayliss | July 7, 1959 |

FOREIGN PATENTS

| | | |
|---|---|---|
| 995,495 | France | Aug. 22, 1951 |
| 773,398 | Great Britain | Apr. 24, 1957 |